United States Patent

[11] 3,630,028

[72] Inventor Leonard H. Caveny
23 Galston Drive RD #4, Trenton, N.J. 08691
[21] Appl. No. 881,062
[22] Filed Dec. 1, 1969
[45] Patented Dec. 28, 1971
Continuation-in-part of application Ser. No. 720,923, Apr. 12, 1968, now abandoned. This application Dec. 1, 1969, Ser. No. 881,062

[54] PRESSURE LEVEL CONTROL SYSTEM FOR A SOLID PROPELLANT ROCKET MOTOR
14 Claims, 13 Drawing Figs.
[52] U.S. Cl. .................................................. 60/234, 60/254
[51] Int. Cl. .................................................. F02k 9/04

[50] Field of Search ............................................ 60/219, 234, 254, 39.47

[56] References Cited
UNITED STATES PATENTS
| | | | |
|---|---|---|---|
| 3,023,573 | 3/1962 | Friedman | 60/234 |
| 3,073,113 | 1/1963 | Faught | 60/254 |
| 3,126,701 | 3/1964 | Henderson | 60/219 |
| 3,381,476 | 5/1968 | Glick | 60/254 |

Primary Examiner—Douglas Hart
Attorney—Cushman, Darby & Cushman

ABSTRACT: A system for controlling the operating pressure and thrust of a solid propellant rocket motor which includes a propellant cutter that extends through the burning surface of the solid propellant to increase on command the burning surface area and thereby increase the burning rate of the solid propellant.

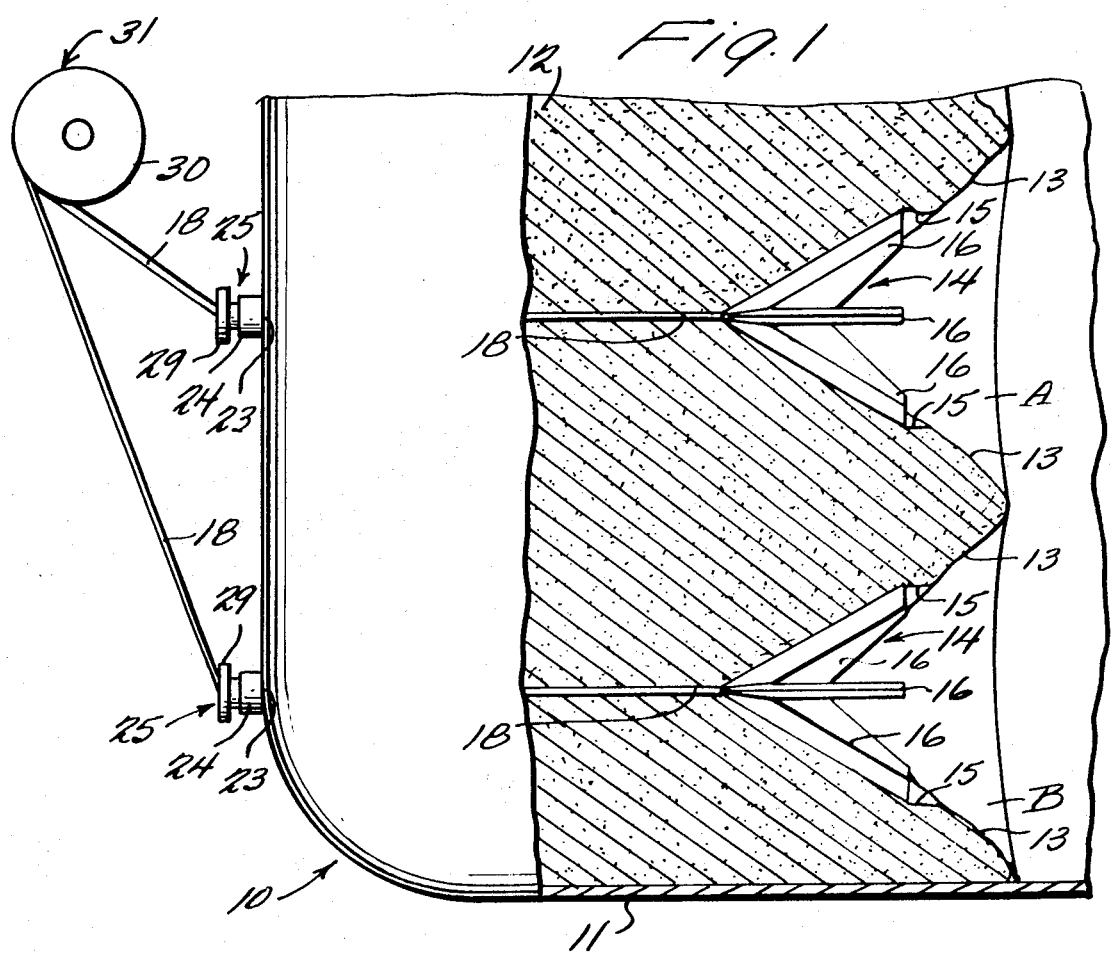
Fig. 1
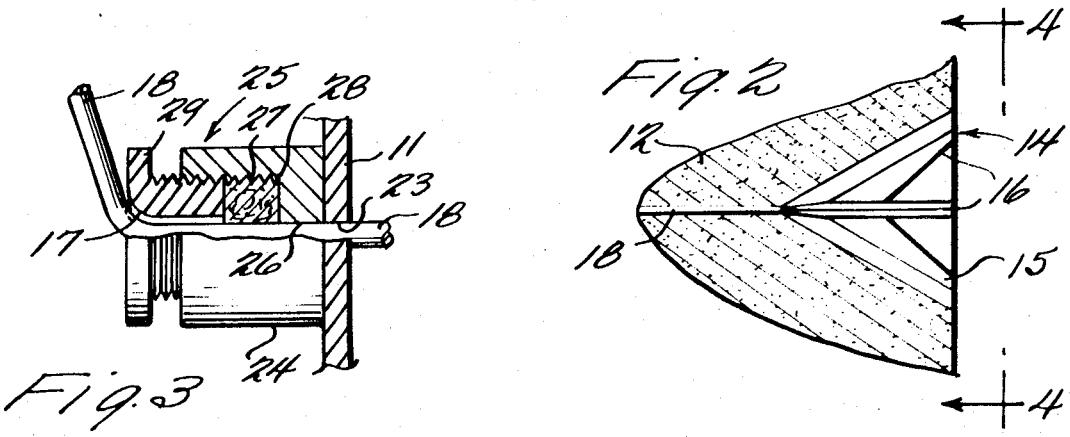
Fig. 2
Fig. 3
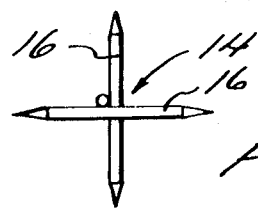
Fig. 4
INVENTOR
LEONARD H. CAVENY
BY
Cushman, Darby & Cushman
ATTORNEYS

INVENTOR
LEONARD H. CAVENY

BY
Cushman, Darby & Cushman
ATTORNEYS

PRESSURE LEVEL CONTROL SYSTEM FOR A SOLID PROPELLANT ROCKET MOTOR

This application is a continuation-in-part of application Ser. No. 720,923, filed Apr. 12, 1968.

This invention relates to an improvement in solid propellant rocket motors and similar gas generating systems, and, in particular, to apparatus for controlling the operating pressure and, thereby, the thrust of such motors.

For many applications, it has become increasingly more desirable to provide control systems for various sizes of solid propellant rocket motors so that the operating pressure and thrust of such motors can be controlled on command over a wide range of operational requirements. It is known that in conventional solid propellant rocket motors, the chamber pressure and thrust level are directly proportioned approximately to the rate at which the solid propellant is consumed. It is also known that during the progression of the burning of the solid propellant, that if an unignited surface of the solid propellant is exposed to the chamber environment of the solid propellant rocket motor, the flame created by the chamber environment will propagate along the unignited surface and cause such surfaces to ignite and thereby increase the burning surface of the solid propellant which will subsequently increase the chamber pressure.

In providing a control system which will utilize the above-described characteristics of solid propellant rocket motors, said control system must be capable of meeting many particularized requirements for operating pressures that may vary from a small change to a change greater than a 20:1 ratio. These same requirements will hold true also where the thrust level is under consideration. Such a control system must also be highly reliable and adaptable for inexpensive mass production. Since extreme performance penalties are incurred when additional weight is added to a flight vehicle, the motor control system must add as little weight as possible to the total weight of the vehicle. Further, in providing such a control system, it is desirable that the system be able to function without being destroyed by a solid propellant of a relatively high flame temperature.

Several attempts have been made to develop high performance pressure-controllable solid propellant rocket motors. These motors have been demonstrated to be operable, but it has also been demonstrated that they have major shortcomings. These shortcomings have prevented wide acceptance of pressure control as a form of thrust control in solid propellant motors. These disadvantages include: (1) requirements for difficult-to-use propellants, (2) large inert weight penalties and (3) production costs precluding use in inexpensive mass-produced systems. Many of the concepts previously studied depend on controlling the throat area of the exhaust nozzles of the solid propellant rocket motors. Mechanisms used to control the throat area are heavy and require complex assemblies to withstand the very high temperatures encountered in the combustion chamber environment and the exhaust gases exiting from the combustion chamber through the exhaust nozzle. The fluid and electrical power systems that are used to drive the throat control mechanisms by their very nature are quite heavy and quite complex. It can be readily understood, therefore, that a heavy complex mechanism that will materially add to the weight of the overall flight system will have not achieved great success in the field. Also, to achieve large changes in thrust with the variable throat area concepts, it is also necessary to utilize especially formulated solid propellants whose burning rates are particularly sensitive to chamber pressure. Such propellants are expensive to manufacture and cannot be used or stored over a wide range of environmental conditions.

An additional technique which has been tried in prior art systems is the forcing of hot spikes or rams against the burning surface of the solid propellant to thereby control the burning rate of the solid propellant and to control the chamber pressure. A system of this nature is described in U.S. Pat. No. 3,266,247. Such systems, however, have been able to achieve only limited control of the burning rate of the solid propellant, and such systems have been subject to the disadvantages of heavy moving parts which were required to withstand the combustion chamber environment.

It is therefore an object of this invention to provide a solid propellant rocket motor having means for continuously controlling on command the operating pressure and thrust of the motor over a wide range and during the complete period which the motor operates, the motor being light in weight, capable of being inexpensively mass produced and not requiring special high performance solid propellants for its operation.

It is another object of this invention to provide a lightweight inexpensive system for a solid propellant rocket motor that on command will provide additional unignited surface areas that will be subsequently ignited to increase the burning rate of the solid propellant in the motor.

A further object of this invention is to provide a control system according to the objects immediately above which may be utilized in either end burning solid propellant rocket motors or those solid propellant rocket motors having internal perforations in the propellant itself.

The aforementioned and other objects may be obtained in a solid propellant rocket motor constructed according to the principles of this invention which may be best understood by reference to the description of preferred embodiments given hereinbelow in conjunction with the drawings in which:

FIG. 1 is a fragmentary schematic view of a first preferred embodiment of a solid propellant rocket motor constructed according to the principles of this invention, illustrating the manner in which one form of the invention is utilized to increase the burning surface of the solid propellant in the motor;

FIG. 2 is a fragmentary schematic view of one form of cutter assembly in position prior to ignition of the solid propellant;

FIG. 3 is a fragmentary, partially cross-sectioned schematic view of a preferred embodiment of an assembly for guiding a wire connected to a cutter assembly outwardly of the solid propellant rocket motor;

FIG. 4 is a rear elevation of the cutter assemblies illustrated in FIGS. 1 and 2 taken along the line 4—4 of FIG. 2 with the solid propellant not being shown;

Figure 12:
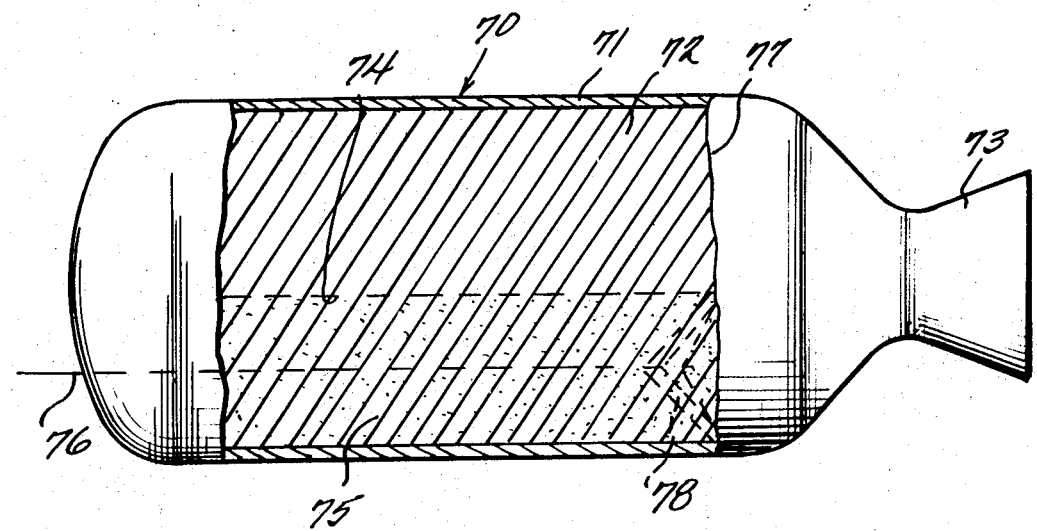
Figure 13:
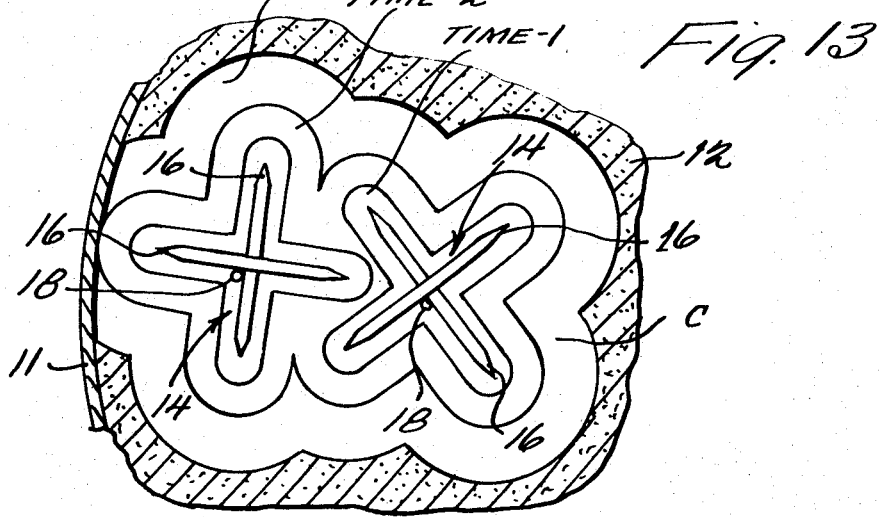

FIG. 12 is a schematic view of a second preferred embodiment of a rocket motor constructed according to the principles of this invention, said rocket motor having a preformed path along which the cutter assembly will traverse and FIG. 13 is a fragmentary schematic rear elevation view of a rocket motor constructed according to the principles of this invention showing the manner in which the burning surface of the solid propellant regresses as the cutter blades are moved forwardly to cut the burning surface.

In FIGS. 1–4 of the drawings a first preferred embodiment of a rocket motor constructed according to the principles of this invention is shown. In these figures as well as in the figures to follow, like elements are indicated by like numerals.

A solid propellant rocket motor 10 comprises a motor casing 11 which contains a solid propellant grain 12. The size, shape and general configuration of the solid propellant motor 10 will depend on the particular operational requirements. In view of the fact that a fundamental principle of this invention involves the use of a cutter assembly which either cuts through the propellant or is pulled through a preformed path in the propellant, a description of the consistency of the solid propellant utilized will be given hereinbelow to facilitate a complete understanding of the invention.

The term "solid propellant" refers to several categories of propellants that may have different physical characteristics. The propellants are solid in that they have no tendency to flow, and they are capable of being stressed while only experiencing a finite deformation or strain. Thus, the propellants are not considered to be extrudable. A typical solid propellant has a tensile strength of 100–1,000 p.s.i. Many of the propellants to which the instant invention can be applied, have a rubberlike texture, e.g., similar to the eraser of a lead pencil, are flexible and can be cut with a blade.

Typically, such propellants may consist of 65 to 75 percent (by volume) solid particles and the remainder an elastic binder. The solid particles may be finely ground (0.0001 to 0.004 inch in mean diameter) oxidizers such as ammonium perchlorate, ammonium nitrate, and potassium perchlorate, and in some formulations metal fuel additives. The binder may be one of the following widely used materials: (1) nitrocellulose in triethylene glycol dinitrate (a plastisol), (2) polybutadiene acrylic acid with epoxy cure, (3) polybutadiene acrylic acid acrylonitrile with imine cure, (4) carboxyl terminated polybutadiene with epoxy cure, and (5) hydroxyl terminated polybutadiene with diisocyanate cure (a polyurethane). These propellants are not brittle and will not split or crack if they are cut by a thin blade. In fact these propellants are routinely cut with blades as part of conventional rocket motor manufacturing processes, and the cutting of such materials does not leave a residue of cuttings, shavings, or the like.

The conventional solid propellant grain 12 has a burning surface 13 and as best shown in FIG. 1 a plurality of cutter assemblies 14 are embedded within the aft ends of the propellant grain 12 so that the aft ends thereof are contiguous with the burning surface 13. Each of the cutter assemblies 14 include a plurality of cutter blades 16. In FIGS. 1, 2 and 4, the cutter assemblies 14 are shown as being comprised of four blades 16, but it is to be understood that any number of blades may be used consistent with the desired cutting effect. As illustrated in FIG. 4, the blades 16 are radially disposed and may be positioned in a diametrically opposed relationship to one another as will any other blades that may be added to the cutter assemblies 14. The blades 16 are secured to a wire 18 by mechanical means such as bonding, soldering, or welding.

The wires 18 with the cutter assemblies 14 secured thereto are positioned in the motor case 11 before the solid propellant grain 12 is cast therein and means, which are not a part of the present invention, retain the cutter assemblies 14 in position in the motor case 11 until the solid propellant grain 12 is cast therein. The cutter assemblies 14 and wires 18 do not interfere with the loading process since they may be moved to one side of the aft opening of case 11 during the loading process. The cutter assemblies and wires are then brought into their proper position during the curing of propellant 12. Such a propellant casting procedure has been demonstrated to be feasible.

For the particular application in an end-burning rocket motor, the wires 18 with the cutter assemblies 14 secured thereto extend in a spaced relationship longitudinally of the motor case and in a parallel relationship to one another and to the centerline of the motor case. As will be discussed more fully hereinbelow with respect to FIG. 13, the spacing between the wires 18 and cutter assemblies 14 will determine the cutting action of the cutter assemblies 14 on the burning surface 13.

As best shown in FIG. 1, at the head end of the motor case 11, there are provided a plurality of openings 23, one for each of the wires 18. A plurality of pressuretight packing glands 25, each having a longitudinal bore 26 therein are secured to the head end of the motor casing 11 so that the bores 26 are in direct communication with the openings 23 in the casing 11.

FIG. 3 illustrates the details of construction of the packing glands 25. The pressuretight packing glands 25 basically comprise a base member 24 having a longitudinally extending bore 26 therein and a threaded recess 27 circumjacent thereto, a suitable packing 28 and a packing gland nut 29. The packing material 28 is placed within the circular threaded recess 27, and the packing gland nut is threadably engaged in the recess 27 compressing the packing 28. A wire 18 extends through each of the packing glands 25 outwardly of the motor case 11.

The wires 18 extending outwardly of the packing glands 25 are attached to a drum 30 of a retraction mechanism 31. When the nut 29 is sufficiently threaded into base member 24, a leakproof seal is formed about each of the wires 18 to prevent any hot combustion gases from escaping through openings 23. It will be noted that the nut 29 is countersunk, as indicated at 17, to prevent wear on the wire 18 as it is drawn through the packing gland 25.

Having described the structural details of a first preferred embodiment of the rocket motor constructed according to the principles of this invention, the mode of operation of said rocket motor will now be discussed.

It will be remembered that the main function of the rocket motor system described herein is to increase on command the area of the burning surface 13. The desired increase in burning surface 13 is created by pulling the wires 18, to which the cutter assemblies 14 are secured, axially through that portion of the solid propellant grain 12 that is immediate forward of the burning surface 13. Such action is caused by actuation of the retracting mechanism by means of the control system to be described more fully hereinbelow with respect to FIG. 5. The rate at which the additional unburned areas of the solid propellant grain 12 are exposed to the burning surface 13 is controlled by the rate of retraction of the wires 18 and cutter assemblies 14 through the unburned portion of the solid propellant grain 12. As the cutter assemblies 14 are pulled through the propellant 12, flames will spread over the newly formed burning surface 13 formed in the cuts 15 (see FIG. 1) and ignite the propellant that forms the walls of the cut 15. Thus, the effective burning rate of the propellant is the rate at which the cutter assembly 14 are pulled through the propellant 12. The steady state pressure within the rocket motor casing 11, and to a good approximation, the rocket motor thrust is directly proportional to the rate at which the cutter assemblies 14 are pulled through the propellant 12. A convenient way of visualizing the operation of the rocket motor 10 described hereinabove is to think of the casing 11 as a container for a propellant 12 with the cutter assemblies 14 being devices for controlling the rate of propellant consumption. The power output of the motor 10 is directly proportional to rate at which the propellant 12 is consumed. If the cutter assemblies 14 are pulled from the nozzle end to the head end of the propellant grain 12, for example, in 10 seconds, a particular power level is obtained. If the time is reduced to, for example, 5 seconds, i.e. the propellant is consumed in half the time, the power delivered by the rocket motor 10 is approximately doubled. In both situations described above approximately the same amount of energy will be delivered by the rocket motor, but in the latter situation the energy was delivered at twice the rate thereby producing twice the power.

Figure 5:
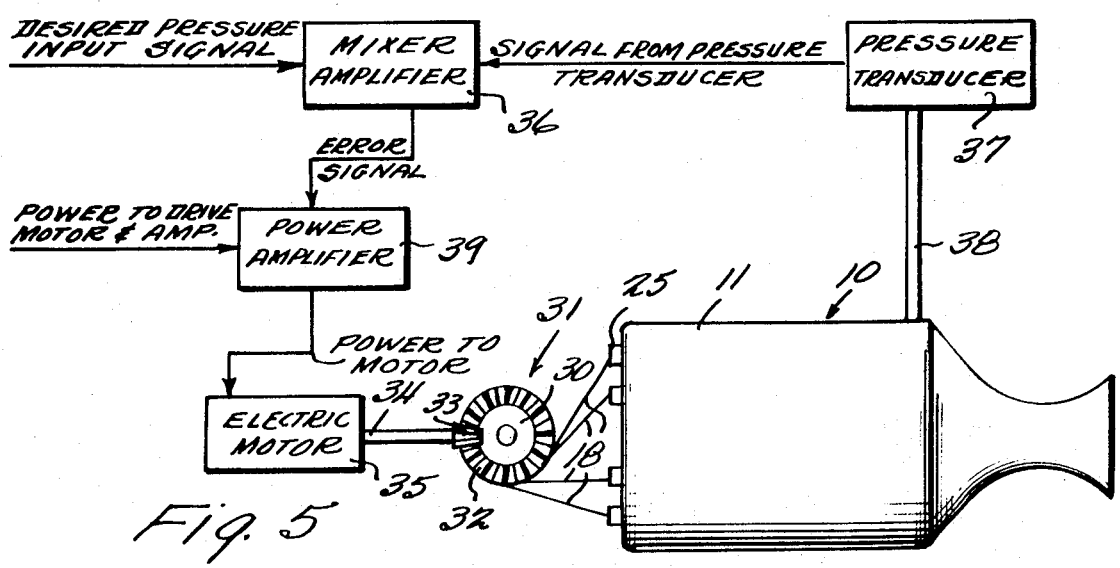
FIG. 5 is a schematic diagram of an entire control system for controlling the combustion chamber pressure according to the principles of this invention.

FIG. 5 illustrates a preferred embodiment of a complete control system designed to effectuate pressure level control within the combustion chamber of the motor 10 described hereinabove with references to FIGS. 1–4.

The retraction mechanism 31 acts to pull the wires 18 axially outwardly of the motor casing 11 and to thereby retract the cutter assemblies 14 through the solid propellant grain 12 in the above-described manner. The wires 18 are therefore attached to the drum 30 so that as drum 30 rotates to retract and to receive on the circumferential surface thereof the wires 18, there will be an equal and predetermined rate of retraction for each of the wires 18. Rotation of drum 30 is provided by means of a spur gear 32 circumferentially secured to one end of drum 30 which is engaged with a pinion gear 33 that is fixed to one end of a drive shaft 34. The opposite end of drive shaft 34 is drivingly connected to a variable speed electric motor 35.

The desired pressure input signal is transmitted by means of a conduit 38 to a pressure transducer 37. The pressure transducer 37 converts this pressure signal to an electrical signal which is coupled to a mixer amplifier 36. The mixer amplifier 36 also receives a second electrical signal which is of a magnitude corresponding to the desired pressure input signal. The above-described two signals are compared in mixer amplifier 36, and an error signal, if any, is coupled to power amplifier 39 which delivers the power to the electric motor as required. The electric motor 35 will then rotate drum 30 an amount commensurate with the magnitude of the error signal if any. It is to be noted that each of the components of the control system described hereinabove are conventional, but the particular control system described is novel.

In operation the control system described in FIG. 5 will vary the rate of retraction of cutter assemblies 14 in the motor 10 as a function of the chamber pressure within the motor casing 11. To do this the FIG. 5 control system monitors the pressure within the motor casing 11 and produces, by means of transducer 37, an electrical signal proportional thereto. By comparing this electrical signal in mixer 36 with an electrical signal proportional to the desired casing pressure, the rate of cutter retraction can be varied to achieve the desired pressure. Therefore, if the desired pressure input signal is greater than the pressure signal from the pressure transducer 37, the mixer amplifier 36 will transmit an error signal to the power amplifier 39 to increase the speed of rotation of electric motor 35 and thereby the speed of rotation of the retracting mechanism 31. If the pressure within casing 11 reaches an equilibrium with the desired pressure, the retraction mechanism 31 will operate at a constant speed because no error signal will be transmitted to vary the speed of motor 35.

If it is desired to increase the burning rate of the solid propellant grain 12 while the motor is producing an equilibrium pressure level, the desired pressure input signal coupled to mixer amplifier 36 is increased in magnitude to increase the rate of retraction of wires 18 and cutter assemblies 14 to reach the newly set equilibrium pressure level.

If it is found that the desired pressure input signal is higher than required, it will be lowered, and the error signal will then be decreased to reduce the power input to the electric motor 35 which will thereby reduce the rate of retraction of wires 18 and cutter assemblies 14. Thus, the error signal transmitted by mixer amplifier 36 will effect the rate of retraction of the wires 18 and cutter assemblies 14 and thereby the burning rate of the solid propellant grain 12 as well as the pressure level within the motor casing 11.

Figure 6:
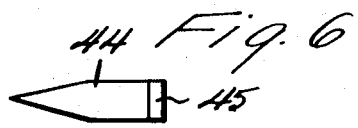
FIG. 6 is a cross-sectional view of a second preferred embodiment of the cutter blade assembly utilized in this invention, having an insulated trailing edge.

FIG. 6 illustrates the pertinent structural details of a second preferred embodiment of a cutter blade designed to be used in the motor 10 described hereinabove. From the operational description of the motor 10 given hereinabove it will be apparent that the ignition of unburned surface area 15 (see FIG. 1) that is created by the cutter assemblies 14 will depend on the width of the cut in a solid propellant grain 12 that is made by cutter blades 16. The exact width necessary to insure ignition will vary with the propellant type and motor operating pressure. This means that the width of the cut must be of a sufficient magnitude to permit the flame created by the burning surface to spread into the cuts made by the cutter blade 16 to permit ignition and burning of the yet unburned surface.

In order to achieve a wider cut a blade 44 as shown in FIG. 6 may be used, but a problem which may be encountered by use of a wider blade may arise out of the increased transference of heat to the blade 44. In order to reduce the amount of heat transfer to the blade 44 because of the wider cut, a thin layer of thermal insulation 45 may be applied to the trailing edge of the blade 44.

Figure 7:
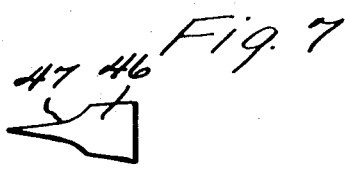
FIG. 7 is a cross-sectional view of a third preferred embodiment of a cutter blade used in this invention having a widened trailing edge.
Figure 8:
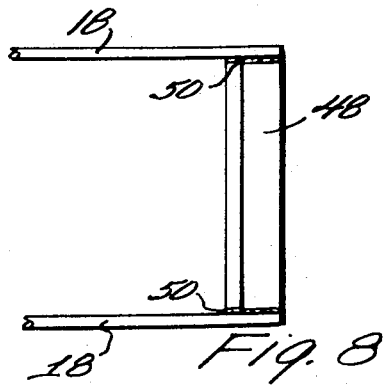
FIG. 8 is a side elevation of a fourth preferred embodiment of a cutter assembly constructed according to the principles of this invention.

FIG. 7 illustrates a cross-sectional view of a third embodiment of a cutter blade which may be used in this invention. The blade 46 is shaped to have a hollow-ground cutting edge 47.

Figure 9:
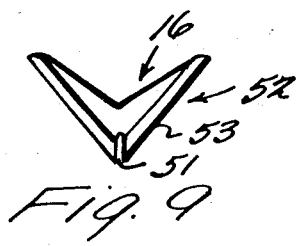
FIGS. 9 and 10 are views illustrating typical cutter blades which may be utilized in this invention showing in detail the means by which separate blades may be interlocked to form a complete cutter blade assembly.
Figure 10:
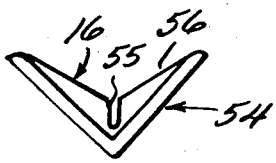

FIGS. 9 and 10 illustrate a mode of forming the cutter blades 16 shown in FIG. 1 as to allow said blades to be interlocked to extend radially outwardly from the wire 18 to which they are attached. In FIGS. 9 and 10 separate blade components 52 and 54 are illustrated, respectively. The blade 52 which has a leading edge 53 has a notch or slit 51 formed along the axial centerline of the leading edge. Blade 54 has a notch 55 formed along the axial centerline of its trailing edge 56. After the blade components 52 and 54 are assembled by interconnecting the notches 51 and 55, respectively, the wire 18 can be joined to the blade assembly by soldering, welding, bonding or the like. The resulting cutter assembly 14 has a small cross-sectional area perpendicular to the direction in which it moves in the propellant 12, and thus, does not cause unnecessary drag when it is being pulled through the propellant. When thin blade materials are used to form blades such as those shown in FIGS. 9 and 10, the forward edges of blade component 52 adjacent notch 51 are subject to bending stresses when blade components 52 and 54 are drawn through the propellant. The leading edge 53 adjacent notch 51 can be made less vulnerable to bending if it is position downstream of the leading edge of blade component 57 during the fabrication of cutter assembly 14.

Figure 11:
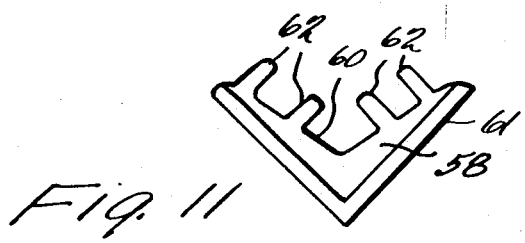
FIG. 11 is a top elevation of a fourth preferred embodiment of a cutter blade constructed according to the principles of this invention which includes protruding elements that cause the blade to be heated by the hot combustion gases.

FIG. 11 illustrates an additional preferred embodiment of a blade component which may be utilized to form a cutter assembly similar to cutter assembly 14. In describing this particular blade component it must be pointed out that there are propellant materials through which it is relatively difficult to pull a cutter assembly such as described hereinabove. Further, in any propellant configuration it is advantageous to be able to reduce the force exerted on the wire 18 to reduce the stresses thereon and on the cutter assembly, and by operating at reduced forces, the materials used for making the blades can be lighter and the wire retraction systems can be made lighter as well. It is well known that as rubberlike or plastic materials are heated they become softer and easier to cut with a blade. Under normal operating conditions the propellant 12 ahead of burning surface 13 is appreciably heated only to a depth of less than 0.01 inch. Thus, the propellant in the vicinity of the cutting edge is not at all softened by the hot burning surface unless the blade is heated by the hot combustion gases. Under normal operating conditions the cutter assemblies 14 like those shown in FIGS. 1 and 2 are heated by the combustion gases only along the backsides or trailing edges of the blades.

Blade 58 shown in FIG. 11, however, is provided with a plurality of fins 62 which project from the trailing edge 60 of the blade. The fins 62 are designed to protrude rearwardly from the blade and extend into the hot combustion gases adjacent the burning surface 13. Heat is conducted from the fins 62 to generally heat the entirety of blade 58, particularly the leading edge thereof 61. Thus, the temperature of the leading edge 61 and the propellant adjacent the leading edge is increased. By so heating the blade 58, propellants which in their unheated state may be classified as hard, brittle and generally difficult to cut with a nonheated blade can be easily cut, and therefore, used with the control system of this invention. That is, the heated blade softens such propellants and makes it possible to pull the cutter assembly through them without requiring excessive force or without shattering or cracking such propellants.

Since heating a solid propellant is a well-established means of increasing the flame spreading rate, heating the propellant surfaces as they are cut by the blades will also promote flames spreading over the newly formed propellant surfaces and flames spreading into narrow cuts in the propellant surface. Thus, if flames spreading into the cut is a problem for a particular propellant, rather than increasing the width of the cut or adding a substance to promote flame spreading into the cut, the blades can be heated to ensure the desired flame spreading. Obviously, it is not intended that the cutter assembly 14 having blade components 58 be heated to the point that either uncontrolled subsurface ignitions of the propellant occur or to the point that the heat causes the cutter assembly itself to fail.

The following example is given to indicate the temperatures which may be achieved in the various components using a cutter assembly having blade components 58. This example is intended in no way to be limiting, and it is given only for the purpose of understanding the principles of this invention. A typical high energy propellant initially at 70° F. has a burning surface temperature of approximately 1,200° F. and a flame temperature of approximately 5,000° F. A fin 62 on a stainless steel blade component 58 can be designed so that it achieves a temperature of 1,800° F., so that it heats the cutting edge 61 to approximately 600° F. Thus, since the propellant in contact with the blade is heated to a temperature of several hundred degrees Fahrenheit, it will become softer, and thereby will become easier to cut so as to exert less force on the sides of the blade.

FIG. 12 illustrates a second preferred embodiment of a solid propellant rocket motor constructed according to the principles of this invention. A motor 70 includes a casing 71 having a nozzle 73 formed at the rearward portion thereof. A solid propellant grain 72, similar to the grain 12 described in FIG. 1, fills the casing 71. Propellant 72, however, has formed therein during the manufacturing process a preformed path 74. The preformed path 74 is designed to accommodate a cutter assembly 78 and allow it to be pulled therethrough without requiring any cutting action. While only a single preformed path 74 is shown in this Figure, any number may be used as desired. The cutter assembly 78 is attached, as described hereinabove, to a wire 76 which pulls it forwardly through the propellant 72 to control the burning rate as described hereinabove with respect to FIG. 1. Thus, in pulling cutter assembly 78 through the preformed path 74 it is not necessary to cut the propellant 72; it is only necessary to overcome friction forces caused by passing the cutter assembly between the walls of the preformed path.

The preformed paths 74 can be formed by any of several means which are not a part of this invention. For example, preformed paths have been cut into sample propellant grains by means similar to the cutter assemblies described in the embodiments hereinabove. Also, they could be formed by mandrels that are cast into the propellant 72 and then withdrawn after the propellant has cured to form the paths.

The mode of operation of rocket motor 70 is similar to that described hereinabove with respect to motor 10. Upon ignition of the solid propellant 72, flames will not propagate past the cutter assemblies 78 and into properly constructed preformed paths because internal stresses in the propellant tend to close the walls of a preformed path 74 around the cutter assembly 78. Also, since the walls of a properly designed preformed path will come together, the preformed path will not result in subsurface cavities which might tend to fill with hot combustion gases. Since the preformed path 74 is plugged by the cutter assembly 78 and since there are no subsurface cavities for the hot combustion gases to flow into, hot combustion gases will not flow past the cutter assembly 78 into preformed path 74.

There are conditions where the walls of a preformed path will reunite and close the path. For example, if the preformed path is made before a polymer-based propellant is sufficiently cured, chemical bonds will form between the propellant surfaces that come into contact. In such cases experiments have shown that the preformed path will still preform the desired function since it is much easier to cut the relatively few new chemical bonds between the previously separated propellant surfaces then it is to cut through the previously unseparated propellant.

The preformed path 74 also provides a means of introducing a composition, such as an antifriction material, along the path of the cutter assembly 78. The composition, illustrated by the dots 75 in FIG. 12, can be worked into or injected into the preformed path 74 by any suitable means. The composition 75, depending on its nature, can serve one or more of the following functions: reducing friction between the cutter assembly 78 and the propellant 72 along the preformed path, acting as a sealant to further eliminate any possibility that either gases or flames propagate between the propellant walls and the cutter assembly 78, promoting the spread of flame along the walls of the propellant exposed by withdrawing the cutter assembly, lubricating the wire 76 as it passes through any seals in the motor casing and preventing bonds from forming between the propellant surfaces that form the opposing walls of the preformed path.

The following compositions, used alone, can perform one or more of the desired functions: talcum powder, powdered graphite, liquid soap, mineral oils and their equivalents for reducing the friction between the cutter assembly and the propellant; liquid soap, silicon grease and their equivalents for preventing bonds from forming between the propellant walls on opposite sides of the preformed path 74; a light grease, wax, and their equivalents as a sealant to prevent flames or gases from propagating between the sides of the cutter assembly 78 and the walls of the preformed path; various well-known iron compounds and copper compounds referred to as burning rate catalysts for accelerating the burning rate of solid propellants and promoting the rate of flame propagation; and liquid soap, light greases and their equivalents for lubricating the wire 76 as it passes through any pressure seal which might be on the motor casing 71. The composition 75 can, as well, be a blend of one or more of the foregoing representative materials depending on the operational requirements.

Experiments which consisted of moving cutter assemblies 78 along preformed paths 74 in propellant grains 72 lubricated with liquid soap and with mineral oil revealed that the force required to move the cutter assemblies 78 was consistently reduced by 50 percent below the force required to pull the same cutter assemblies through the same propellant that had preformed paths that were not lubricated. Tests demonstrated that lubricating the preformed path 74 with liquid soap prevented bonds from forming between the propellant walls on the opposite sides of the preformed path.

In order to prevent wire 76 from bonding to propellant 72 or for that matter preventing wire 18 from bonding to the propellant 12 in the FIG. 1 embodiment, during the motor manufacturing process, from time to time during the propellant curing period, the wire 18 can be moved axially as to break any bond that might have formed between the wire 18 and the propellant 12. This method has been used successfully in the preparation of test specimens. Also, various well-known mold release agents can be applied to the wires 18 or 76 before the propellant is cast therearound, and thus, prevents bonds from forming between the wire and propellant.

FIG. 13 illustrates a fragmentary view of the aft end of the embodiment of the motor shown in FIG. 1. The purpose for this Figure is to illustrate the cavity progression as the cutter assemblies 14 are drawn through the propellant 12. The description of this Figure will further clarify the operation of a rocket motor constructed according to the principles of this invention.

As shown in FIG. 1, combustion of solid propellant grain 12 as created by the progression of burning surface 13, will create two cavities, one for each cutter assembly, the cavities being labeled A and B. These cavities are created because the portion of solid propellant grain 12 not immediately adjacent to a cutter assembly 14 will burn in a generally outward direction and will burn at a linear rate perpendicular to its surface that is less than the linear rate at which the cutter is retracted. If a steady rate of retraction of wires 18 and cutter assemblies 14 are achieved, the burning surface 13 will, after a short period of time, produce an equilibrium shape which will consist of a series of intersecting, noncircular cross section cavities, as shown in FIG. 13. In FIG. 13 these cavities are labeled for the successive time intervals of burning and are designated as TIME 1 and TIME 2 and TIME 3. It will be apparent, therefore, that the cavities A and B formed by cutter assemblies 14, as shown in FIG. 1, will evolve into a larger cavity C as shown in FIG. 13. The cavity C will conform in some respects to the original cavities A and B formed by the cutter assemblies 14 in FIG. 1.

The instant invention always controls the burning rate of the propellant so that the burning rate in the vicinity of the cutter assembly is greater than the burning rate of the basic propellant. The chamber pressure is increased by increasing the retraction rate of the cutter assembly. The chamber pressure is decreased by decreasing the degree that the retraction rate of the cutter assembly is above the linear burning rate of the basic propellant thus, when a decrease in burning rate is referred to, a decrease in burning rate below the basic propellant burning rate is not intended, and of course, is not obtainable.

The retraction rate of cutter assemblies 14 must be such that the wires 18 and the leading edges of the blades 16 will always be maintained forward of the burning surface 13. If this position of the cutter assemblies is not maintained, the solid propellant grain 12 surrounding cutter assembly 14 will be burned away and the cutter assemblies will be engulfed and destroyed by the intense heat that occurs in the combustion chamber in motor casing 11. This, however, will not be the result if the rate of retraction of a cutter assembly is correctly determined and maintained. There is no doubt that the flame can be made to propagate into a cut 15, as shown in FIG. 1, or split in a high energy propellant surface that is adjacent to an existing burning surface. Indeed, flame propagation into very small propellant flaws produced by faulty manufacture of propellant is a common mode of rocket motor failure. Some difficulty may be experienced, however, with special purpose under-oxidized, low-energy propellants; this can be cured with the use of small oxidizer particle sizes and burning rate catalysts which tend to enhance flame propagation rates or with the use of the previously described heated blade 58. Thus, if flames spreading problems were encountered with a particular propellant, burning rate catalyst could be introduced into the preformed path as described above, during the motor manufacturing procedures, or a heated blade could be used.

Referring again to FIG. 13 it must be noted that the greater the depth of the cavities A, B or C, the greater the increase in the burning surface area and the greater the increase in the burning rate of the solid propellant grain 12. Thus, the steepness of the walls of the cavities and their depth will depend on the ratio of the burning rate of the solid propellant grain 12 and the rate of retraction of the cutter assemblies. Further, with reference to FIG. 13, it is to be noted that the configuration of the cavities formed by the cutter assembly shown therein will depend on the actual number of cutting blades and total number of cutting assemblies used.

It was pointed out hereinabove that one of the primary objects of this invention is to overcome the difficulties with the previous techniques of mechanically controlling the burning rates of solid propellants. One of the principle difficulties was in the exposure of the mechanical mechanisms used for such systems to the combustion chamber environment. This difficulty is not present with the cutter assemblies used in this invention because a significant portion of such assemblies are always being retracted ahead of the burning surface 13, for this reason the assemblies will only receive a limited amount of heat along the edges of the cutter blade 16 that are most adjacent to and ahead of the burning surface 13. This small amount of heat does not build up to a level where it will damage the cutter assemblies 14 because the unburned solid propellant grain 12 forward of the burning surface 13 will tend to cool the cutter assemblies. The cutter assemblies 14 are in close contact with the unburned portion of the solid propellant grain 12, and this close contact will cause heat to be conducted from the blades 16 and wire 18 to the relatively cool solid propellant. As was pointed out hereinabove with respect to FIG. 11, the cutter blades can be designed to even conduct a greater amount of heat into the propellant for the desirable results to be obtained thereby as was discussed hereinabove.

A range of blade thicknesses, widths, numbers and geometries were evaluated by pulling cutter assemblies 14 through inert propellants. Tests were conducted over a range of retraction rates between 2 and 14 in./sec. The cutter assemblies were assembled in the manner indicated by FIGS. 4, 9 and 10. During these tests the force on the wire 18 and cutter assembly speed were recorded on an oscillograph. The most prominent results of these tests were (1) beyond cutter assembly speeds of 1 in./sec., the force required to pull the cutters through the propellant was relatively insensitive to the speed at which the cutter assembly was pulled through the propellant; (2) if a preformed path 74 is used, the force required to pull the cutter assembly 78 through the propellant is reduced by at least 40 percent of the force that would be required for an uncut propellant 12; (3) cutting the propellant does not appreciably dull the blades 16.

Typical forces required to pull the 1.25 and 0.5-inch wide, 0.010-inch thick, four-blade cutter assemblies 78 through preformed paths at approximately 10 in./sec. are 30 and 15 pounds, respectively. Careful examination of the cutter assemblies in the preformed paths 74 indicate that the cutter assemblies 78 completely restrict the opening to prevent flames from propagating past the trailing edge of the cutter assemblies. Blade thicknesses of 0.010 inches were found to be satisfactory from the standpoint of drag on the cutter assembly, ease of fabrication, and blade strength.

Pressurization of the propellant grain 12 does not increase the force required to pull the cutter assemblies 14 through the propellant 12. Tests were conducted with a propellant grain at atmospheric pressure conditions and at pressures of 500 p.s.i.; the force required to move the cutter assembly 14 through the propellant 12 was the same.

Several seals 25 for passing cables through the motor case 11 were tested. One very successful seal used a very small (0.05-inch thick and 0.10-inch diameter) piece of silicone rubber packing 28 and was tested at pressures up to 1,500 p.s.i. At pressures above 500 p.s.i., the wires 18 (0.031 inch in diameter and lubricated with mineral oil) passing through the seal tended to be forced out of the motor case by the pressure, and, thus, there is no drag on the wire caused by that particular seal.

The descriptions of the preferred embodiments given hereinabove are designed to be only exemplary, and it will be apparent to those skilled in the art that modifications can be made to the elements or their structural arrangement within the scope of the appended claims. In particular while given cutter and propellant configurations have been described many others may be used which will achieve the desired results, and while an electrical control system was discussed for controlling the retraction rate of the cutters, other systems, such as hydraulic systems, may be used.

What is claimed is:

1. In a solid propellant rocket motor comprising a casing defining a combustion chamber and a solid propellant grain substantially filling said combustion chamber and having a burning surface, apparatus for controlling the pressure level in said combustion chamber comprising
   cutter means for exposing additional unburned areas of said solid propellant to said burning surface, and
   means for controlling the rate at which said cutter means operates to expose said unburned areas, said means for controlling including means for sensing the pressure level within said combustion chamber and varying the rate of operation of said cutter means for exposing responsive to said pressure.

2. The apparatus defined in claim 1 wherein said cutter means is adapted to cut through said solid propellant ahead of said burning surface, and wherein said means for controlling includes means for retracting said cutter means through said propellant.

3. A variable burning rate solid propellant motor comprising a casing defining therein a combustion chamber, a solid propellant grain having a burning surface placed within said combustion chamber, cutting means embedded in said solid propellant and adapted to cut through said solid propellant ahead of said burning surface, forming an opening in the unburned portion of said propellant in communication with said burning surface, retracting means for pulling said cutting means through said solid propellant and control means operably connected to said retracting means for controlling the rate at which said retracting means pulls said cutting means through said solid propellant.

4. The motor defined in claim 3 wherein said cutting means comprises at least one cutting assembly having a plurality of blade components with cutting blades extending radially outwardly from a center thereof.

5. The motor defined in claim 4 wherein said cutting assembly comprises a plurality of blade components having notches formed in the centers thereof as to allow said blade components to be joined in an interlocking relationship.

6. The motor defined in claim 4 wherein each of said blade components includes means for supplying heat to said blade component, said blade component being in close proximity to the unburned solid propellant as it is pulled therethrough as to transmit heat to said solid propellant.

7. The motor defined in claim 6 wherein said means for supplying heat comprises a plurality of fins projecting from a trailing edge of each said blade component into combustion gases outwardly of said burning surface.

8. The motor defined in claim 4 wherein each said blade component includes a hollow ground leading edge for cutting and a noncutting portion adapted to broaden the cut made by said leading edge when said blade component is pulled through said solid propellant.

9. The motor defined in claim 4 wherein each said blade component includes a leading edge adapted for cutting through said solid propellant and a trailing edge having a thin, relative to the thickness of said blade component, layer of insulating material applied thereto.

10. The motor defined in claim 3 wherein said cutting means comprises at least one elongated blade and wherein said retracting means includes a pair of wires attached to the ends of said blade for pulling said blade through said solid propellant.

11. In a propellant rocket motor assembly including a casing defining therein a combustion chamber and a solid propellant grain having a burning surface placed in said combustion chamber, apparatus for controlling the pressure level within said combustion chamber comprising cutting means embedded within said propellant and adapted to be pulled therethrough ahead of said burning surface, retracting means for pulling said cutting means through said solid propellant, sensing means for sensing the pressure within said combustion chamber and for producing a signal corresponding to said pressure, comparing means for receiving and comparing said signal from said sensing means with a signal of predetermined magnitude, said comparing means including means for producing an error signal of a magnitude corresponding to the difference between said signal from said sensing means and said predetermined signal, and drive means for operating said retraction means, said drive means connected to respond to said error signal as to operate said retraction means and thereby said cutting means at a rate which is a function of the magnitude of said error signal.

12. The apparatus defined in claim 11 wherein said sensing means comprises a transducer for converting a sensed pressure into an electrical signal corresponding thereto and conduit means for communicating the pressure in said combustion chamber to said transducer wherein said comparing means is adapted to produce an electrical error signal responsive to the difference between a predetermined electrical signal and said signal from said transducer and wherein said drive means is adapted to operate in response to said electrical error signal.

13. A variable burning rate solid propellant rocket motor comprising:

a casing defining therein a combustion chamber, a solid propellant grain placed within said combustion chamber and having a burning surface, cutting means embedded within said solid propellant and adapted to be pulled therethrough ahead of said burning surface, said solid propellant having formed therein at least one preformed path shaped to receive said cutting means and to facilitate the motion of said cutting means through said solid propellant, retracting means for pulling said cutting means through said preformed path and control means operably connected to said retracting means for controlling the rate of which said retracting means pulls said cutting means through said solid propellant.

14. A variable burning rate solid propellant rocket motor as in claim 13 wherein said preformed path contains a material selected from the group consisting of lubricating compositions, sealant compositions, burning rate accelerating compositions, bond-preventing compositions, and mixtures thereof.

* * * * *